Patented Feb. 24, 1948

2,436,670

UNITED STATES PATENT OFFICE 2,436,670

TRISODIUM PHOSPHATE DODECAHYDRATE AND PROCESS FOR MANUFACTURING SAME

Cecil H. Russell, Trenton, Mich., assignor to Monsanto Chemical Company, St. Louis, Mo., a corporation of Delaware No Drawing. Application January 24, 1944, Serial No. 519,536

10 Claims. (Cl. 23—107)

This invention relates to a process for manufacturing trisodium phosphate dodecahydrate which involves crystallization of trisodium phosphate from an aqueous solution under controlled conditions whereby a product is obtained having predetermined physical properties.

A particular object of the invention is to provide a process for making trisodium phosphate dodecahydrate wherein the bulk density of the product and the ratio of the length to the diameter of the individual phosphate crystals (L/D) may be controlled to meet specific requirements, thus making it possible to meet the consumer demand that a standard container shall contain a specified weight of the product.

Another object is to provide a process for making trisodium phosphate dodecahydrate of uniform bulk density and particle size.

Another object is to provide a process for making trisodium phosphate dodecahydrate of decreased bulk density and increased L/D ratio.

Another object is to provide a process for controlling the bulk density and the L/D ratio of trisodium phosphate dodecahydrate crystals which comprises adding sodium silicate to the trisodium phosphate solution, adjusting the titration ratio of the solution in relation to the amount of sodium silicate added and then crystallizing said phosphate from the solution by cooling.

A further object is to provide a process for controlling the bulk density and the L/D ratio of trisodium phosphate dodecahydrate crystals which comprises adjusting the titration ratio of the trisodium phosphate solution, adding a sufficient amount of sodium silicate based on the titration ratio of the solution to give the desired result and then crystallizing said phosphate from the solution by cooling.

A still further object is to control the bulk density, the L/D ratio and the particle size of the trisodium phosphate crystals by correlating the variables, ratio, silica content and the concentration of the trisodium phosphate solution, with respect to each other, and then crystallizing said phosphate from the solution by cooling.

Other objects will be apparent to those skilled in the art as the description proceeds.

According to the present practice trisodium phosphate is generally prepared by reacting 50% to 75% phosphoric acid with sodium carbonate in the proper proportions to produce disodium phosphate. This product is then treated with sodium hydroxide to form an aqueous solution of trisodium phosphate from which the latter is crystallized by cooling in a continuous water-cooled or vacuum-cooled crystallizer. When a vacuum crystallizer is employed, the practice has been to add at least 2% by weight of seed crystals to the trisodium phosphate solution to initiate crystallization. The slurry produced by either of these methods of crystallization is centrifuged or otherwise treated to separate the crystals from the mother liquor which is recycled and used as a vehicle for the soda ash-acid reaction.

The product thus obtained is generally unsatisfactory as it is characterized by a variable bulk density, L/D ratio and particle size. Usually the bulk density is too high, the L/D ratio is too low and the proportion of crystals of the desired mesh (plus 50 mesh) is too small.

I have made an extensive investigation of the problem and have ascertained that the control of bulk density, the ratio of length to diameter of the crystals (L/D) and the size of the crystals of trisodium phosphate is dependent upon a number of variables. These variables are titration ratio, silica content, concentration, sodium carbonate content, difference between the temperature of seeding and the saturation temperature (equilibrium point), cooling rate, quality and size of seeds and seeding technique. The first two variables are critical in nature; the others should be considered but they are of relatively minor importance. However, it should be stated here that under certain conditions hereinafter described, the cooling rate may also become a critical variable.

By titration ratio as used in the specification and claims, I mean the ratio of the number of c. c. of standard acid required to titrate a given quantity of trisodium phosphate to the phenolphthalein end point to the number of c. c. of the same acid required to continue the titration to the methyl orange end point. For example, if a given quantity of trisodium phosphate requires 54 c. c. of half normal hydrochloric acid to titrate to the phenolphthalein end point and 46 c. c. of this acid to titrate from this point to the methyl orange end point, then the titration ratio of the trisodium phosphate within the meaning of this specification is 54 divided by 46 or 1.17.

Stated in terms of composition, titration ratio may be defined as the number of sodium atoms or equivalent bases which are more basic than disodium phosphate divided by the number of sodium atom or equivalent bases which are more basic than monosodium phosphate but not more basic than disodium phosphate.

Turning now to a discussion of the above variables, titration ratio and silica content will be considered first as they play the most important role in controlling the bulk density and the L/D of trisodium phosphate crystals.

I have found that if the titration ratio of a trisodium phosphate solution is lowered prior to crystallization, the bulk density of the crystals will be decreased and the L/D ratio will be increased. The effect, however, is not directly proportional to the titration ratio variation as there is only a very small change in the bulk density and L/D ratio within the range of 1.17 to 1.30, whereas titration ratio changes from 1.05 to 1.17 produce a substantial change in the bulk density and L/D ratio of the product.

The addition of silica in the form of sodium silicate substantially lowers the bulk density and increases the L/D ratio of the trisodium phosphate crystals. At a given trisodium phosphate titration ratio the magnitude of the effects is directly proportional to the concentration of the silica present so that this is a very effective way to control these properties of the product.

Concentration has substantially no effect on the crystal shape or bulk density of the products. It does have considerable influence on sizing and this is due to the fact that more crystal matter is precipitated during the crystallization of the more concentrated solutions than in the case of the more dilute solutions. When this increased quantity of crystal matter is divided among the same number of seed crystals, larger crystals are formed. It is, therefore, desirable that the concentration of the trisodium phosphate solution be maintained as high as possible without causing mechanical difficulties. Very satisfactory results are obtainable when the concentration of the trisodium phosphate solution is such that crystallization starts at a temperature between 45° C. and 55° C. Stated in a different manner, the density of the solution should fall within the range of 42 TW and 72 TW at 55° C.

Up to concentrations of about 3% such as occur in trisodium phosphate plant liquors, sodium carbonate has only a minor effect on the bulk density, L/D or the sizing of the product so that for practical purposes this variable may be ignored.

Within the limits where the seeds are not dissolved, the difference between the temperature of seeding and the saturation temperature (equilibrium point) has only a minor effect on the bulk density or sizing of the product. When large quantities of coarse seed are used, this factor has practically no significance. With small quantities of fine seed, this is an important factor.

The cooling rate under certain conditions is a very important factor in the crystallization of trisodium phosphate hydrate. In general increased cooling rates result in products having a higher L/D and a lower bulk density and if the cooling is rapid enough to cause the formation of new nuclei, this factor has a definite influence upon the size of the crystals. Notwithstanding this fact, increased cooling rates have no appreciable effect on the above properties until the rates are sufficiently high to cause supercooling and the formation of new nuclei. When this occurs the cooling rate becomes a critical factor and cannot be ignored. However, if sodium silicate is added to the trisodium phosphate solution prior to crystallization and the solution is cooled at a rate at which substantial supercooling and the formation of new nuclei are avoided, then the cooling rate is not a critical factor in the control of the bulk density, the L/D and the sizing of the product. It then assumes a role of minor importance and, therefore, does not require careful control.

The seed quality and quantity has a definite influence on sizing and apparently some effect on bulk density. For example, the quality and quantity of seed determines the number of particles present and the initial crystal surface. The number of particles in the seed and the initial size of these particles together with the quantity of crystal matter deposited from solution are the principal factors determining the particle size of the product. The initial seed surface determines the rate at which crystal matter can be absorbed from solution. Hence it determines the cooling rate which is permissible without the formation of new nuclei. It seems probable that taken together with the cooling rate, it has some influence on the L/D and the bulk density.

Seeding technique is an important factor when employing a small quantity of fine seeds, otherwise it is relatively unimportant when compared with the effect of titration ratio and the silica content of trisodium phosphate on the bulk density of the product. By seeding very close to the equilibrium point and using a very slow initial cooling rate which may be increased during the latter part of the crystallization, it is possible to use a small weight of fine seeds (0.10 to 0.50% by weight) and still obtain a product containing around 90% of plus 50 mesh crystals.

The seed crystals should be added as close to the equilibrium point as possible. If they are added at too high a temperature they will dissolve and if added after the liquid has supercooled, they may form new nuclei and result in the formation of an undesirable amount of fines.

So far as I am aware, no one has suggested a satisfactory method for controlling the bulk density, the L/D and particle size of crystallized trisodium phosphate.

Patent 1,883,447 to Ammen broadly teaches that sodium silicate may be used to remove impurities from trisodium phosphate mother liquor and that by such treatment the crystallizing conditions are improved, the yield of crystals from a given amount of mother liquor is increased and a superior type of crystal is produced. However, it is believed apparent that the sodium silicate is removed together with the impurities from the mother liquor and that in the actual crystallization step no sodium silicate is present. In any event there is no teaching in this patent that the bulk density and the L/D ratio of trisodium phosphate can be controlled by means of sodium silicate. This is strikingly evident from the fact that it is not possible to control these properties of trisodium phosphate by means of sodium silicate without taking into consideration the titration ratio factor. Furthermore, I use larger amounts of sodium silicate than is required to eliminate impurities. Hence the action of sodium silicate in my process is entirely different from the action of this compound in the process disclosed in the above patent.

Now I have found that if the factors, titration ratio and silica content, are properly correlated prior to crystallization of the trisodium phosphate solution, a product of controlled bulk density and L/D ratio can be obtained. More particularly, I have discovered that if concentrated solutions of trisodium phosphate are employed, if the factors (titration ratio and silica content), are properly correlated and if the solutions are seeded as close to the equilibrium point as possible with a small quantity of very fine seeds (about 0.10 to 0.50% by weight of trisodium phosphate solution), the bulk density, the L/D ratio and the particle size of the crystals can be controlled.

In carrying out experiments to demonstrate the effect of varying the titration ratio and silica content on the bulk density and the L/D ratio of trisodium phosphate crystals, I proceeded as follows:

Trisodium phosphate solutions were prepared by mixing disodium phosphate, liquid caustic and water in the proper proportions. After mixing, the solutions were filtered to remove any solid impurities.

The filtered solutions were treated with the proper amounts of caustic soda or disodium phosphate to give the desired titration ratio, after which the solutions were adjusted to the exact equilibrium point, that is, they were brought to a temperature at which they were exactly saturated. Equilibrium point adjustments were made by dilution with water if lowering of this point were desired and by evaporation of the solution if increases in equilibrium point were necessary. When sodium silicate was added to show its effect on the bulk density, etc. of the trisodium phosphate, it was added before the titration ratio and equilibrium points were determined.

After the final adjustment of the solutions, they were charged into a crystallizer provided with a stirrer, a seed funnel, a vacuum line and instruments for controlling and recording the pressure and temperature. The solutions were cooled by radiation until the temperature reached such a point that cooling by vacuum evaporation to the seed point would give the desired equilibrium point at the time of seeding. As the extent of elevation of the equilibrium point of the trisodium phosphate solutions is directly proportional to the amount of water evaporated and as the equilibrium point of the charged solutions and the amount of water evaporated in a given period of time under a predetermined vacuum were known, the temperature to which the solution had to be cooled by radiation to give the desired result was readily calculated.

The solutions were then subjected to a vacuum which was applied slowly and gradually until a temperature of about 2 or 3° above the seed point was reached in 5 to 10 minutes.

When the temperature reached the seed point, the vacuum line was closed and the seed crystals were added through an inlet valve at the top of the crystallizer. The valve was closed as quickly as possible and the vacuum line reopened until the pressure in the crystallizer prior to seeding was restored. Cooling was continued with automatic control until a temperature of 30° C. was reached.

After cooling to 30° C., the vacuum was released and the crystallizer discharged into a centrifuge. The crystals from the centrifuge were dried in a stream of air at about 70° C.

Following the above procedure experiments were carried out using trisodium phosphate of various titration ratios to show the effect of this factor on bulk density, L/D and particle size. The conditions under which the experiments were conducted and the results obtained are tabulated in the following table:

*Tests to show the effect of titration ratio using pure solutions*

| Feed solution | | | | |
|---|---|---|---|---|
| Weight (lbs.) | 52 | 52 | 52.0 | 51.25 |
| Titration ratio | 1.075 | 1.102 | 1.170 | 1.280 |
| Density at 55° C. | 49.6 Tw | 49 Tw | 48 Tw | 45.6 Tw |
| Per cent $P_2O_5$ | 9.08 | 9.09 | 9.08 | |
| Special additions: | | | | |
| $Na_2CO_3$ | None | None | None | None |
| Silica | do | do | do | Do |
| Other | do | do | do | Do |

| Crystallization data | | | | |
|---|---|---|---|---|
| E. P. of solution as charged | 48.99° C | 48.93° C | 49.96° C | 50.58° C |
| Temperature of solution charged | 80.0° C | 79.0° C | 60.0° C | 60.6° C |
| E. P. after cooling to seed temperature | 50.76° C | 50.65° C | 50.87° C | 51.02° C |
| Desired temperature of seeding | 51.26° C | 51.15° C | 51.37° C | 51.52° C |
| Actual temperature of seeding | 51.24° C | 51.11° C | 51.32° C | 51.50° C |
| Seeding: | | | | |
| Wt. of seed used | 475 gms | 475 gms | 475 gms | 465 gms |
| Temperature drop during seeding | 0.41° | 1.36° | 0.50° | 0.50° |
| L/D of seed | 2-4 | 2-4 | 2-4 | 2-4 |
| Screen test of seed: | | | | |
| R 30 | Trace | Trace | Trace | Trace |
| CR 40 | do | do | do | Do |
| CR 50 | 7.6 | 7.6 | 7.6 | 7.6 |
| CR 70 | 89.2 | 89.2 | 89.2 | 89.2 |
| CR 80 | 99.8 | 99.8 | 99.8 | 99.8 |
| CR 100 | 99.9 | 99.9 | 99.9 | 99.9 |
| CR 200 | 99.9 | 99.9 | 99.9 | 99.9 |
| S 200 | 0.1 | 0.1 | 0.1 | 0.1 |
| Appearance of seed under microscope | Mostly square ends. Almost no twinning. Very few adherent particles. Edges were chipped and rounded. | Mostly square ends. Almost no twinning. Very few adherent particles. Edges were chipped and rounded. | Mostly square ends. Almost no twinning. Very few adherent particles. Edges were chipped and rounded. | Mostly square ends. Almost no twinning. Very few adherent particles. Edges were chipped and rounded. |
| Rate of cooling | 8°/hr | 8°/hr | 8°/hr | 8°/hr |
| RPM of stirrer | 416 | 415 | 412 | 415 |
| Final temperature | 30° C | 30° C | 30° C | 30° C |
| Weight of crystals (lbs.) | 15.5 | 12.75 | 15.25 | 14.25 |

| Dried crystals | | | | |
|---|---|---|---|---|
| Bulk density (−16+50 mesh portion) | 0.93+ grams per c. c. | 0.96 grams per c. c. | 0.98+ grams per c. c. | 0.98 grams per c. c. |
| Moisture (−16+50 mesh portion) | 55.18% | 54.87% | 54.97% | 54.67% |
| L/D (−16+50 mesh portion) | 2.0-3.5 | 1.2-3.0 | 1.2-2.0 | 1.2-3.0. Only a very few crystals were of this maximum ratio. |
| Titration ratio (−16+50 mesh portion) | 1.208 | 1.211 | 1.202 | |
| Appearance under microscope (−16+50 mesh portion) | Mostly square ends. Very few pyramids. Edges badly rounded. A few twins. Seeds easily visible in crystals. | Mostly square ends. Edges rounded. Very little twinning. Very few adherent particles. | 20% pyramidal ends. Edges rounded. No twinning. Some seeds visible. | 50% pyramidal ends. Edges badly rounded 3 or 4 twins on slide. No adherent particles. |
| Screen test: | | | | |
| R 16 | Trace | Trace | Trace | Trace |
| CR 30 | 6.0 | 20.9 | 32.8 | 15.4 |
| CR 40 | 66.5 | 86.2 | 84.5 | 75.0 |
| CR 50 | 72.9 | 90.0 | 85.4 | 95.6 |
| CR 70 | 76.7 | 91.0 | 87.0 | 97.7 |
| CR 100 | 85.6 | 93.8 | 90.8 | 98.8 |
| S 100 | 14.4 | 6.2 | 9.2 | 1.2 |

This table clearly demonstrates that as the titration ratio of the solution is lowered, the bulk density of the product is lowered and the L/D ratio is increased.

E. P. in the table designates the equilibrium point, that is, the temperature at which the solution was exactly saturated, and L/D is the ratio of the length of the trisodium phosphate crystal to its diameter.

Similar experiments were conducted to show the effect of adding sodium silicate to the trisodium phosphate solutions of various ratios. The conditions employed and the results obtained are illustrated in the next two tables:

*Tests to show the effect of sodium silicate additions to otherwise pure solutions at a titration ratio around 1.15*

| Feed solution | | | |
|---|---|---|---|
| Weight (lbs.) | 51.75 | 52.25 | 52.5. |
| Titration ratio | 1.154 | 1.148 | 1.163. |
| Density (at 55° C.) | 48.4 Tw | 50.8 Tw | 52.9 Tw. |
| Per cent $P_2O_5$ | 8.77 | 9.20 | 10.55. |
| Special additions: | | | |
| $Na_2CO_3$ | None | None | None. |
| Silica (as sodium silicate) | do | 1.35% | 2.7%. |
| Other | do | None | None. |
| Crystallization data | | | |
| E. P. of solution as charged | 50.04° C | 49.63° C | 49.69° C. |
| Temperature of solution charged | 63.0° C | 67.0° C | 65.6° C. |
| E. P. after cooling to seed temperature | 50.77° C | 50.66° C | 50.60° C. |
| Desired temperature of seeding | 51.27° C | 51.16° C | 51.10° C. |
| Actual temperature of seeding | 51.25° C | 51.03° C | 51.05° C. |
| Seeding: | | | |
| Wt. of seed used | 470 gms | 475 gms | 475 gms. |
| Temperature drop during seeding | 0.35° | 0.30° | 0.25°. |
| L/D of seed | 2.0–4.0 | 2.0–4.0 | 2.0–4.0. |
| Screen test of seed: | | | |
| R 30 | Trace | Trace | Trace. |
| CR 40 | do | do | Do. |
| CR 50 | 7.5 | 7.5 | Do. |
| CR 70 | 89.2 | 89.2 | 49.1. |
| CR 80 | 99.8 | 99.8 | 91.8. |
| CR 100 | 99.9 | 99.9 | 98.7. |
| CR 200 | 99.9 | 99.9 | 99.9. |
| S 200 | 0.1 | 0.1 | 0.1. |
| Appearance of seed under microscope | 90% square ends. Edges chipped and rounded. Very little twinning and very few adherent particles. | 90% square ends. Edges chipped and rounded. Very little twinning and very few adherent particles. | All square ends. Edges chipped. No twins. Many asherent particles. |
| Rate of cooling | 8°/hr | 8°/hr | 8°/hr. |
| R. P. M. of stirrer | 415 | 415 | 415. |
| Final temperature | 30° C | 30° C | 30° C. |
| Weight of crystals (lbs.) | 15 | 13.4 | 13.7. |
| Dried crystals | | | |
| Bulk density (−16+50 mesh portion) | 0.96 grams per c. c. | 0.92+ grams per c. c. | 0.89 grams per c. c. |
| Moisture (−16+50 mesh portion) | 54.92% | 54.28% | 55.04%. |
| L/D (−16+50 mesh portion) | 1.0–2.0 | 2.0–4.0 | 2.5–5.0. |
| Titration ratio (−16+50 mesh portion) | 1.220 | 1.219 | 1.212. |
| Appearance under microscope (−16+50 mesh portion) | 50% pyramidal ends. Edges chipped and rounded. A few twins. Very few adherent particles. | 50% pyramidal ends. Edges slightly rounded. A few parallel twins. | All square ends. Edges slightly rounded. A few twins. No adherent particles. |
| Screen test: | | | |
| R 16 | Trace | Trace | Trace. |
| CR 30 | 5.9 | 44.6 | 4.5. |
| CR 40 | 55.7 | 86.9 | 65.4. |
| CR 50 | 89.1 | 90.8 | 92.4. |
| CR 70 | 93.6 | 93.4 | 95.2. |
| CR 100 | 96.5 | 96.6 | 97.8. |
| S 100 | 3.5 | 3.4 | 2.2. |

*Tests to show the effect of sodium silicate additions to otherwise pure solutions at a titration ratio around 1.20*

| Feed solutions | | | |
|---|---|---|---|
| Weight (lbs.) | 51.5 | 52.5 | 52.75. |
| Titration ratio | 1.206 | 1.197 | 1.200. |
| Density (at 55° C.) | 47.8 Tw | 51.4 Tw | 53.30 Tw. |
| Per cent $P_2O_5$ | 8.47 | 8.83 | 9.09. |
| Special additions: | | | |
| $Na_2CO_3$ | None | None | None. |
| Silica (as sodium silicate) | do | 1.35% | 2.7%. |
| Other | do | None | None. |
| Crystallization data | | | |
| E. P. of solution as charged | 50.56° C | 50.26° C | 49.88° C. |
| Temperature of solution as charged | 59.7° C | 62.00° C | 65.0° C. |
| E. P. after cooling to seed temperature | 50.93° C | 50.92° C | 50.75° C. |
| Desired temperature of seeding | 51.43° C | 51.42° C | 51.25° C. |
| Actual temperature of seeding | 51.42° C | 51.40° C | 51.23° C. |
| Seeding: | | | |
| Weight of seed used | 468 gms | 478 gms | 480 gms. |
| Temperature drop during seeding | 0.30° | 0.30° | 0.6°. |
| L/D of seed | 2.0–4.0 | 2.0–4.0 | 2.0–4.0. |
| Screen test of seed: | | | |
| R 30 | Trace | Trace | Trace. |
| CR 40 | do | do | Do. |
| CR 50 | 7.6 | 7.6 | 7.6. |
| CR 70 | 89.2 | 89.2 | 89.2. |
| CR 80 | 99.8 | 99.8 | 99.8. |
| CR 100 | 99.9 | 99.9 | 99.9. |
| CR 200 | 99.9 | 99.9 | 99.9. |
| S 200 | 0.1 | 0.1 | 0.1. |
| Appearance of seed under microscope | 90% square ends. Edges chipped and rounded. Very little twinning or adherent particles. | 90% square ends. Edges chipped and rounded. Very little twinning or adherent particles. | 90% square ends. Edges chipped and rounded. Very little twinning or adherent particles. |
| Rate of cooling | 8°/hr | 8°/hr | 8°/hr. |
| RPM of stirrer | 414 | 415 | 415. |
| Final temperature | 30° C | 30° C | 30° C. |
| Weight of crystals (lbs.) | 15.1 | 16.25 | 16.5. |

*Tests to show the effect of sodium silicate additions to otherwise pure solutions at a tritration ratio around 1.20—Continued*

Dried crystals

| | | | |
|---|---|---|---|
| Bulk density (−16+50 mesh portion) | 0.99 grams per c. c. | 0.94+ grams per c. c. | 0.92− grams per c. c. |
| Moisture (−16+50 mesh portion) | | 54.30 | 53.98. |
| L/D (−16+50 mesh portion) | | 2.0–4.0 | 2.5–4.0. |
| Titration ratio (−16+50 mesh portion) | | 1.208 | 1.207. |
| Appearance under microscope (−16+50 mesh portion) | | 40% pyramidal ends. Edges rounded. No twins on slide. No adherent particles. | 30% pyramidal ends. Edges rounded. No twins. No adherent particles. |

Screen test:

| | | | |
|---|---|---|---|
| R 16 | Trace | Trace | Trace. |
| CR 30 | 25.0 | 29.0 | 15.5. |
| CR 40 | 88.6 | 85.2 | 76.4. |
| CR 50 | 94.0 | 87.9 | 82.0. |
| CR 70 | 96.8 | 89.9 | 84.9. |
| CR 100 | 97.9 | 94.6 | 99.9. |
| S 100 | 2.1 | 5.4 | 0.1. |

These tables show that the bulk density of trisodium phosphate can be controlled by adding sodium silicate to trisodium phosphate prior to crystallizing same; that at a given titration ratio the effect is directly proportional to the amount of silicate added and that sodium silicate definately increases the L/D ratio of the crystals.

The sodium silicate employed in the above experiments was grade F sodium silicate of the Philadelphia Quartz Company, containing 29% by weight of $SiO_2$.

Although the above tables demonstrate the effect of titration ratio and sodium silicate on pure trisodium phosphate solutions, the effect of these variables on commercially produced phosphate solutions containing the normal impurities is of the same order of magnitude.

As ordinarily produced, trisodium phosphate solutions have a titration ratio of approximately 1.15–1.17 and a density of about 56 Twaddell at 55° C. At this titration ratio and density excellent results are obtainable by adding sodium silicate thereto in an amount yielding 0.5 to 2.0% by weight of silica in the recycled mother liquor. If desired, larger or smaller quantities of sodium silicate may be employed. At a titration ratio of 1.17 the most satisfactory results are obtained by using a sufficient amount of sodium silicate to yield about 1% of silica in the mother liquor. It should be understood, however, that the optimum amount of silicate that should be used will vary with the titration ratio of the trisodium phosphate solution.

As indicated above a titration ratio variation from 1.17 to 1.30 has little effect on the bulk density and the L/D ratio of the phosphate crystals so that within this range the effect of sodium silicate on these properties of the product is substantially directly proportional to the amount of silicate added. On the other hand the effect of titration ratio within the range of 1.05 to 1.17 is much greater and, therefore, less sodium silicate is required to control the bulk density and the L/D ratio of the crystals.

While it has been stated above that the seed crystals should be added in an amount equivalent to 0.1 to 0.5% by weight of the trisodium phosphate solution, larger or smaller quantities may be used if desired.

The above description has been limited to a process wherein the titration ratio of the trisodium phosphate solution is adjusted after the addition of the sodium silicate, but it should be understood that this procedure may be reversed, that is, the titration ratio of the solution may be adjusted first and then a sufficient amount of sodium silicate to give the desired result may be added.

Although the foregoing description has been restricted to the use of a vacuum crystallizer, it is to be understood that my invention is also applicable to a process for manufacturing trisodium phosphate dodecahydrate in which a water-cooled crystallizer is employed.

The foregoing detailed description has been given for clearness of understanding only and no unnecessary limitations should be understood therefrom, but the appended claims should be construed as broadly as permissible in view of the prior art.

What I claim is:

1. The process of manufacturing crystalline trisodium phosphate of a predetermined bulk density and having a predetermined length to diameter ratio of the individual crystals, which comprises adjusting the titration ratio of the trisodium phosphate solution to a predetermined value within the range of from 1.05 to 1.30, then adding sodium silicate thereto, then crystallizing said phosphate from the solution by cooling, and thereupon separating the crystals from the mother liquor, said sodium silicate being added in an amount yielding from about 0.5% to about 2% by weight of silica in said mother liquor.

2. The process defined in claim 1 wherein sodium silicate is added in an amount yielding about 1% by weight of silica in the mother liquor.

3. The process of manufacturing crystalline trisodium phosphate of a predetermined bulk density and having a predetermined length to diameter ratio of the individual crystals, which comprises adjusting the titration ratio of a trisodium phosphate solution having a density of from 42 to 72 Twaddell at 55° C. to a predetermined value within the range of from 1.05 to 1.30, then adding sodium silicate thereto, then crystallizing said phosphate from the solution by vacuum crystallization, and thereupon separating the crystals from the mother liquor, said sodium silicate being added to the trisodium phosphate solution in an amount yielding from 0.5% to 2% by weight of silica in said mother liquor.

4. The process of manufacturing crystalline trisodium phosphate of a predetermined bulk density and having a predetermined length to diameter ratio of the individual crystals, which comprises adjusting the titration ratio of a trisodium phosphate solution having a density of about 56 Twaddell at 55° C. to a value of about 1.17, then adding sodium silicate thereto, seeding the resulting solution at substantially the equilibrium point with about 0.1% to about 0.5% by weight of very fine seeds, then crystallizing said phosphate from said solution by vacuum crystallization, and thereupon separating the crystallized product from the mother liquor, said sodium silicate being added in an amount yielding about 1% by weight of silica in said mother liquor.

5. The process of manufacturing crystalline trisodium phosphate of a predetermined bulk density and having a predetermined length to diameter ratio of the individual crystals, which comprises adjusting the titration ratio of a trisodium phosphate solution having a density of from 42 to 72 Twaddell at 55° C. to a predetermined value within the range of from 1.17 to 1.30, then adding sodium silicate thereto, seeding the resulting solution at substantially the equilibrium point, then crystallizing said phosphate from said solution, and thereupon separating the crystallized product from the mother liquor, said sodium silicate being added to said trisodium phosphate solution in an amount yielding from 0.5% to 2% by weight of silica in said mother liquor.

6. The process of manufacturing crystalline trisodium phosphate of a predetermined bulk density and having a predetermined length to diameter ratio of the individual crystals, which comprises introducing a trisodium phosphate solution having a temperature of about 67° C. and a density of about 52 Twaddell at 55° C. into a vacuum crystallizer, adjusting the titration ratio of said solution to about 1.15, then adding sodium silicate thereto, cooling the resulting solution to about 51° C., seeding it and continuing the cooling operation at the rate of about 8° C. per hour until a temperature of about 30° C. is reached, and thereupon separating the crystallized product from the mother liquor, said sodium silicate being added in an amount yielding from 0.5% to 2% by weight of silica in said mother liquor.

7. The process of manufacturing crystalline trisodium phosphate of a predetermined bulk density and having a predetermined length to diameter ratio of the individual crystals, which comprises introducing a trisodium phosphate solution having a temperature of from 62° C. to 65° C. and a density of from 51.4 to 53.3 Twaddell at 55° C. into a vacuum crystallizer, adding sodium silicate thereto, adjusting the titration ratio of the solution to about 1.20, cooling the solution to about 51° C., seeding it and continuing the cooling operation at the rate of about 8° C. per hour until a temperature of 30° C. is reached, and thereupon separating the crystallized product from the mother liquor, said sodium silicate being added in an amount yielding from 0.5% to 2% by weight of silica in said mother liquor.

8. The process of manufacturing crystalline trisodium phosphate of a predetermined bulk density and having a predetermined length to diameter ratio of the individual crystals, which comprises adding sodium silicate to a trisodium phosphate solution, adjusting the titration ratio of said trisodium phosphate solution to a predetermined value within the range of from 1.05 to 1.30, then crystallizing said trisodium phosphate from the solution by cooling, and thereupon separating the crystals from the mother liquor, said sodium silicate being added in an amount yielding from about 0.5% to about 2% by weight of silica in said mother liquor.

9. The process of manufacturing crystalline trisodium phosphate of a predetermined bulk density and having a predetermined length to diameter ratio of the individual crystals, which comprises adjusting the titration ratio of a trisodium phosphate solution having a density of from 42 to 72 Twaddell at 55° C. to a predetermined value within the range of from 1.05 to 1.30, then adding sodium silicate thereto, then crystallizing said phosphate from the solution by cooling, and thereupon separating the crystals from the mother liquor, said sodium silicate being added in an amount yielding from about 0.5% to about 2% by weight of silica in the mother liquor.

10. The process of manufacturing crystalline trisodium phosphate of a predetermined bulk density and having a predetermined length to diameter ratio of the individual crystals, which comprises adjusting the titration ratio of a trisodium phosphate solution having a density of from 42 to 72 Twaddell at 55° C. to a predetermined value within the range of from 1.05 to 1.17, then adding sodium silicate thereto, seeding the resulting solution at substantially the equilibrium point, then crystallizing said phosphate from said solution, and thereupon separating the crystallized product from the mother liquor, said sodium silicate being added to said trisodium phosphate solution in an amount yielding from 0.5% to 2% by weight of silica in said mother liquor.

CECIL H. RUSSELL.

REFERENCES CITED

The following references are of record in the file of this patent:

UNITED STATES PATENTS

| Number | Name | Date |
| --- | --- | --- |
| 1,689,547 | Carothers | Oct. 30, 1928 |
| 1,814,300 | Duschak | Oct. 14, 1931 |
| 1,883,447 | Ammen | Oct. 18, 1932 |
| 2,050,249 | Adler | Aug. 11, 1936 |
| 2,204,357 | Heckert | June 11, 1940 |
| 2,375,054 | Waddell | May 1, 1945 |

OTHER REFERENCES

Handbook of Chemistry and Physics, 16th edition, Chemical Rubber Publishing Co., Cleveland, Ohio, pages 768 to 770.